(12) United States Patent
Tamura

(10) Patent No.: US 9,077,708 B2
(45) Date of Patent: Jul. 7, 2015

(54) INFORMATION PROCESSING SYSTEM, CONTROL METHOD FOR CONTROLLING THE INFORMATION PROCESSING SYSTEM, AND STORAGE MEDIUM

(75) Inventor: Yu Tamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 116 days.

(21) Appl. No.: 13/447,479

(22) Filed: Apr. 16, 2012

(65) Prior Publication Data

US 2012/0297472 A1 Nov. 22, 2012

(30) Foreign Application Priority Data

May 18, 2011 (JP) ................................. 2011-111586

(51) Int. Cl.
*H04L 29/06* (2006.01)
*G06F 21/41* (2013.01)
*G06F 15/16* (2006.01)

(52) U.S. Cl.
CPC ............ *H04L 63/0815* (2013.01); *G06F 21/41* (2013.01)

(58) Field of Classification Search
CPC ................ G06F 21/41; H04L 63/0815; H04L 29/06768
USPC .......................................................... 726/8
See application file for complete search history.

(56) References Cited

U.S. PATENT DOCUMENTS

| 8,839,395 B2* | 9/2014 | Poliashenko et al. ............. 726/8 |
| 2003/0195970 A1* | 10/2003 | Dinh et al. ..................... 709/229 |
| 2004/0260953 A1* | 12/2004 | Jamieson et al. ............. 713/202 |
| 2005/0005094 A1* | 1/2005 | Jamieson et al. ............. 713/155 |
| 2006/0271689 A1* | 11/2006 | Kikuchi ......................... 709/227 |
| 2007/0240206 A1* | 10/2007 | Wu et al. ........................... 726/8 |
| 2008/0059804 A1* | 3/2008 | Shah et al. ..................... 713/186 |
| 2008/0092215 A1* | 4/2008 | Soukup et al. ..................... 726/5 |
| 2008/0155688 A1* | 6/2008 | Casazza ......................... 726/21 |
| 2008/0184349 A1* | 7/2008 | Ting ................................. 726/7 |
| 2009/0217367 A1* | 8/2009 | Norman et al. ................... 726/8 |
| 2009/0282125 A1* | 11/2009 | Jeide et al. ..................... 709/217 |
| 2009/0292927 A1* | 11/2009 | Wenzel et al. ................. 713/185 |

(Continued)

FOREIGN PATENT DOCUMENTS

JP 2004-234329 A 8/2004

*Primary Examiner* — Ashok Patel
*Assistant Examiner* — Gary Garcia
(74) *Attorney, Agent, or Firm* — Canon USA, Inc., IP Division

(57) ABSTRACT

A second information processing system to communicate with a first information processing system includes an acquisition unit, an acceptance unit, a confirmation unit, and a setting unit. The acquisition unit acquires authentication information from the first information processing system and from a memory of the second information processing system. The acceptance unit accepts correspondence information indicating correspondence between first authentication information and second authentication information. The confirmation unit confirms, as a condition, whether the acquired authentication information in the first information processing system is identical to the accepted first authentication information and confirms, as a condition, whether the acquired authentication information in the second information processing system is identical to the accepted second authentication information. The setting unit does not set the correspondence information as single sign-on setting information if a condition is not satisfied and sets the correspondence information as single sign-on setting information if both conditions are satisfied.

20 Claims, 18 Drawing Sheets

(56) References Cited

U.S. PATENT DOCUMENTS

| | | |
|---|---|---|
| 2010/0050251 A1* | 2/2010 | Speyer et al. .................. 726/20 |
| 2011/0023090 A1* | 1/2011 | Asati et al. ....................... 726/4 |
| 2011/0023107 A1* | 1/2011 | Chen et al. ..................... 726/12 |
| 2012/0023565 A1* | 1/2012 | Tumanyan ....................... 726/8 |
| 2012/0216267 A1* | 8/2012 | Austel et al. ..................... 726/8 |
| 2012/0291114 A1* | 11/2012 | Poliashenko et al. ............. 726/8 |

* cited by examiner

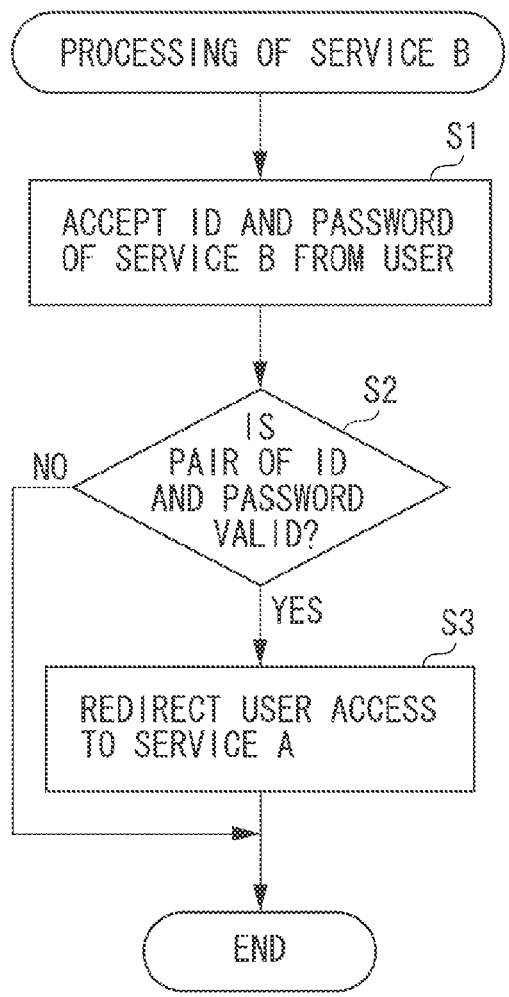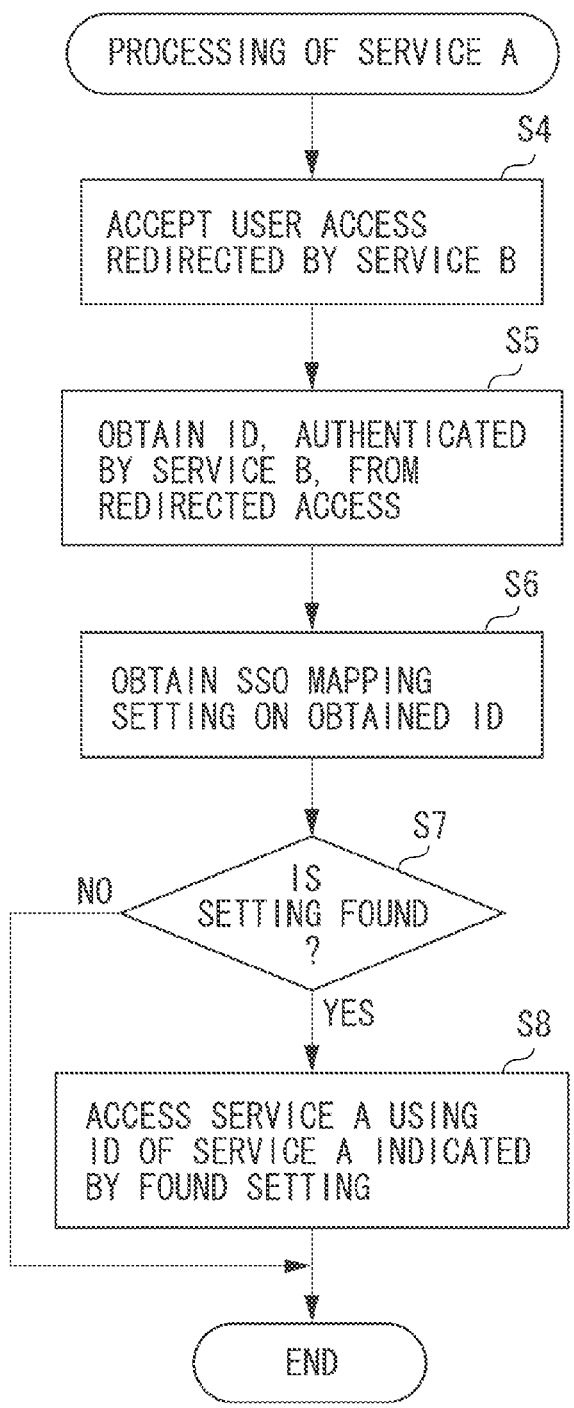

FIG. 6A  FIG. 6B
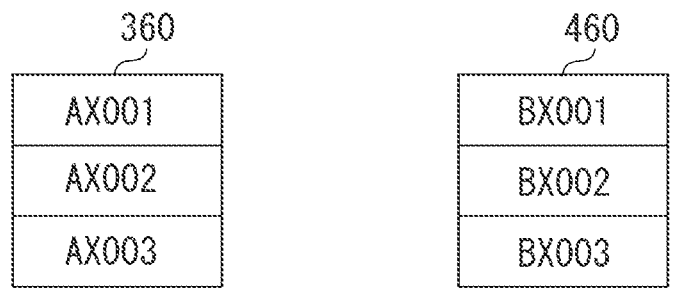
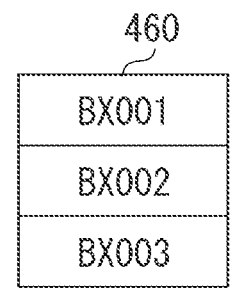
FIG. 6C
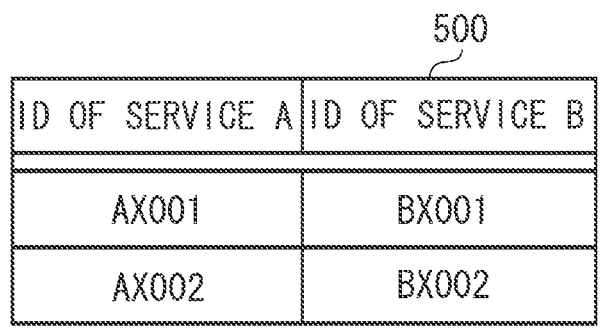

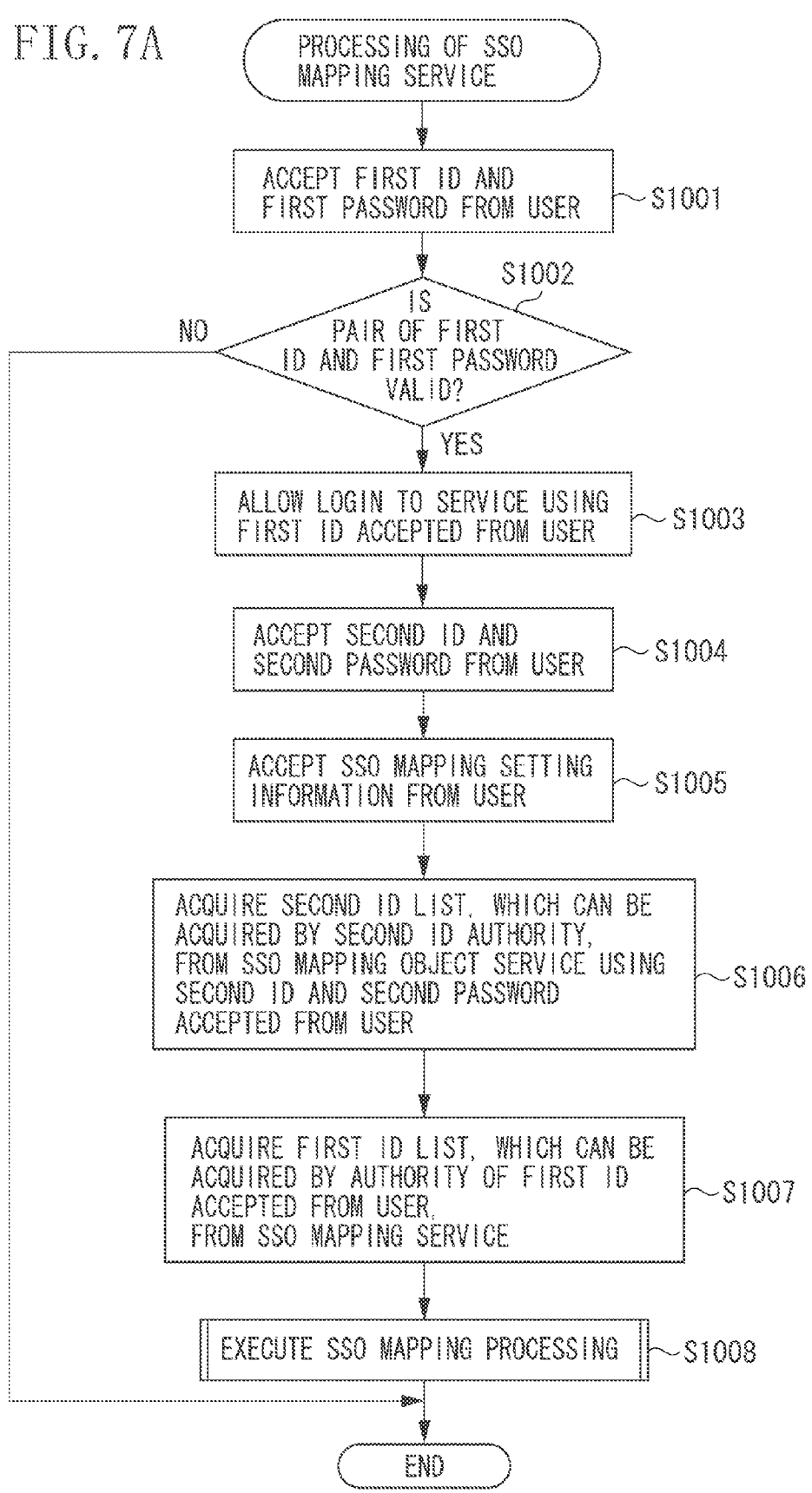

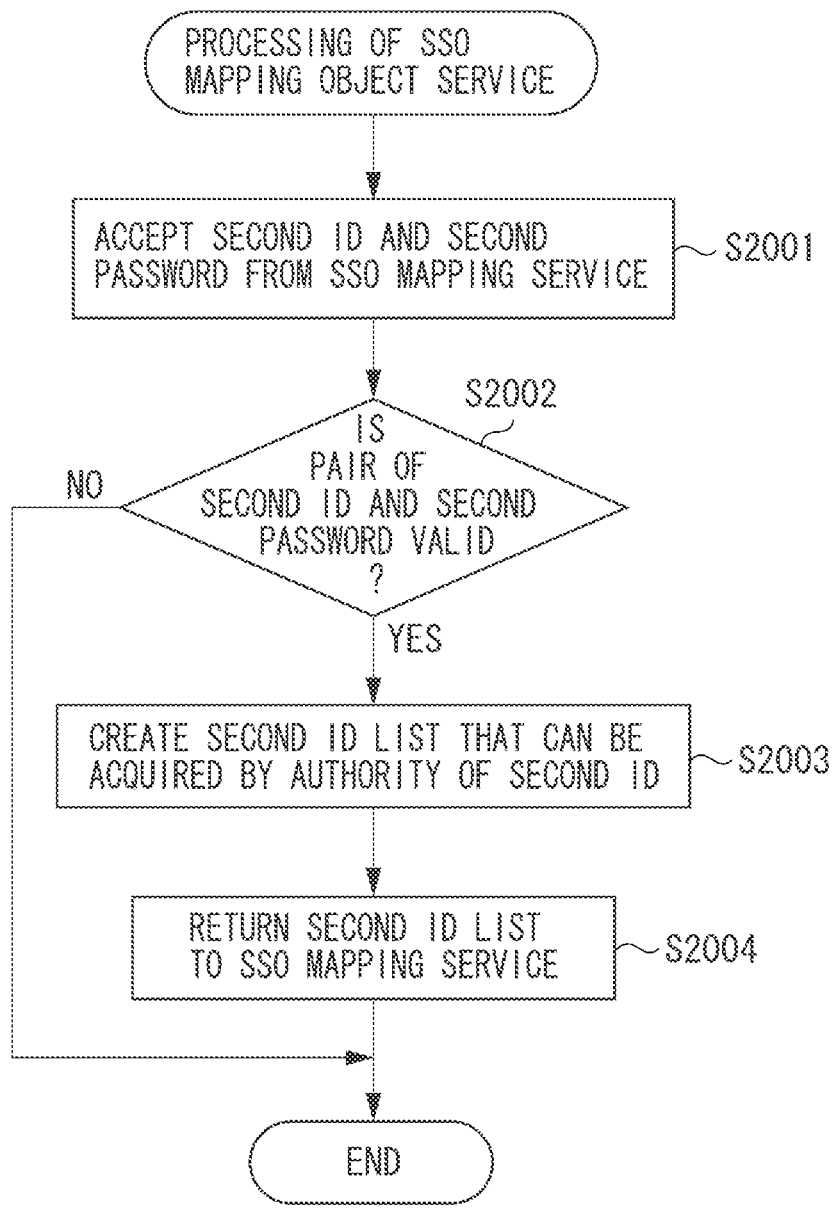

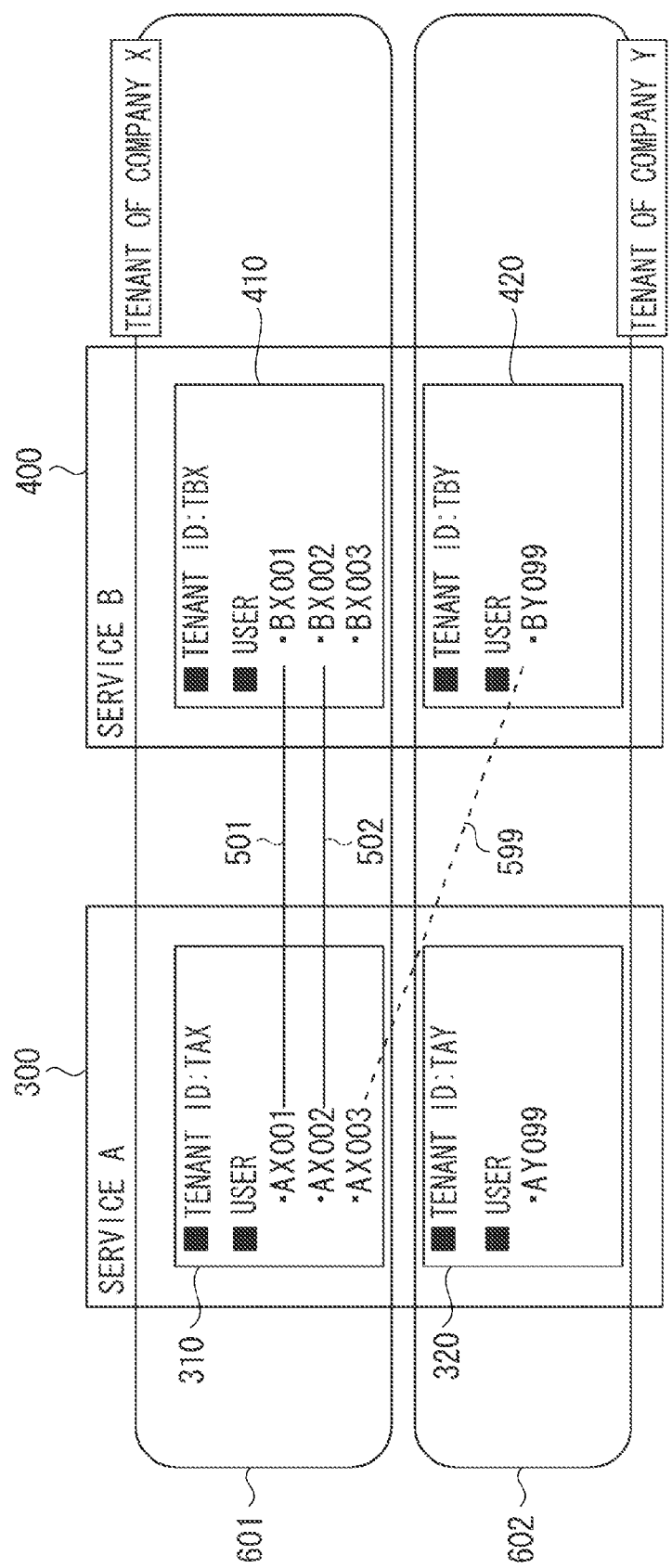

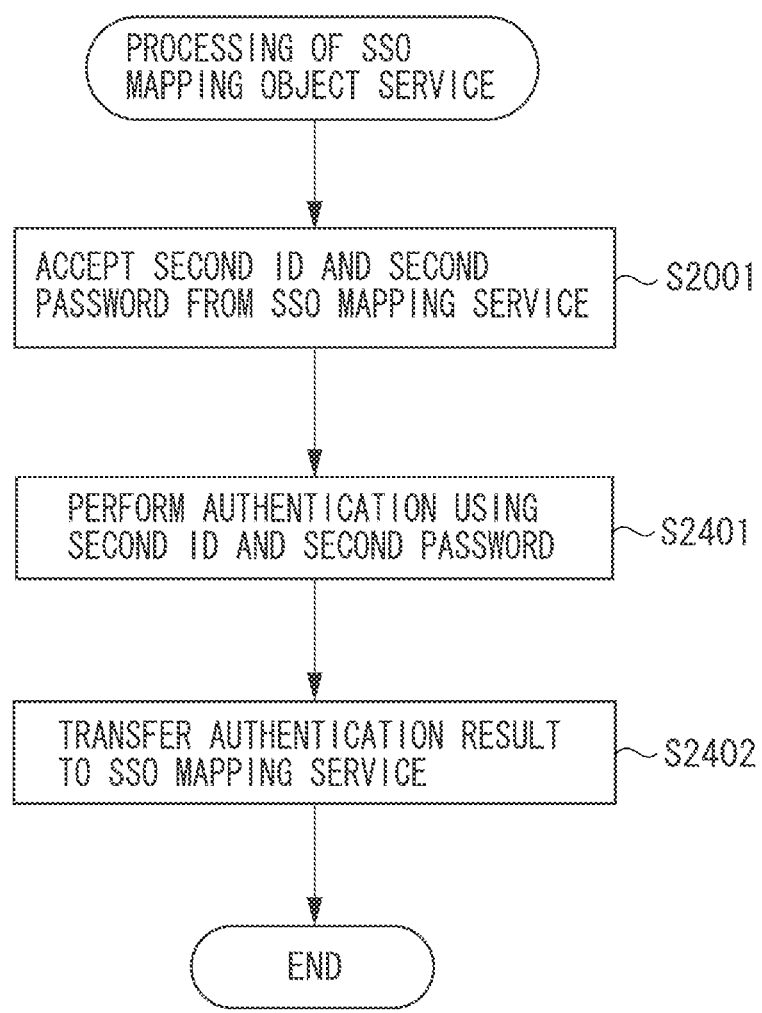

SSO MAPPING COLLECTIVE SETTING PAGE

IdP USER ID

IdP PASSWORD

SETTING FILE   [REFERENCE]

[SET]

SSO MAPPING INDIVIDUAL SETTING PAGE

IdP USER ID

IdP PASSWORD

[SET]

INFORMATION PROCESSING SYSTEM, CONTROL METHOD FOR CONTROLLING THE INFORMATION PROCESSING SYSTEM, AND STORAGE MEDIUM

BACKGROUND OF THE INVENTION

1. Field of the Invention

The present invention relates to an information processing system that supports single sign-on, a control method for controlling the information processing system, and a storage medium.

2. Description of the Related Art

Conventionally, as a technology for authentication cooperation among a plurality of services, there is a single sign-on (hereinafter referred to as SSO) mechanism based on security assertion markup language (hereinafter referred to as SAML).

In SAML-based SSO, the user has an ID both for the authentication service providing side (identity provider, hereinafter referred to as IdP) and for the service providing side (service provider, hereinafter referred to as SP) that provides services relying on the authentication result of the authentication service. For example, when the user accesses the IdP first, the user must be authenticated by the IdP. Therefore, the user is authenticated by the IdP using the user's IdP ID and password.

The IdP can issue a SAML assertion to the authenticated user to prove that the user is authenticated. When the user uses this SAML assertion to access the SP, the SP authenticates the access relying on the authentication result of the IdP. In this case, once authenticated by the IdP, the user who accesses the SP can be authenticated by the SP using the SAML assertion described above without using the user's SP ID and password.

SSO is implemented as described above. When accessing the SP via SSO, the user does not pass the user's SP ID to the SP as described above. Therefore, the correspondence relationship between an IdP ID authenticated by the IdP and an SP ID used for accessing the SP, is to be solved.

In the description below, the correspondence relationship between an IdP ID and an SP ID is called as single sign-on mapping (hereinafter referred to as SSO mapping). To implement SSO, an appropriate SSO mapping must be set to solve the ID correspondence relationship.

Conventionally, Japanese Patent Application Laid-Open No. 2004-234329 discusses a system in which an SSO mapping server is used. This SSO mapping server creates an SP ID in advance and saves the created SP ID without assigning it to the user. When the user passes the ID and password to the IdP and the authentication is successful, the SSO mapping server assigns the SP account newly to the user. This system implements SSO mapping when the IdP confirms user validity.

SUMMARY OF THE INVENTION

According to an aspect of the present invention, a second information processing system capable of communicating with a first information processing system includes an acquisition unit configured to acquire authentication information in the first information processing system from the first information processing system and to acquire authentication information in the second information processing system from a memory of the second information processing system, an acceptance unit configured to accept correspondence information indicating correspondence between first authentication information and second authentication information, a confirmation unit configured to confirm, as a first condition, whether the acquired authentication information in the first information processing system is identical to the accepted first authentication information and to confirm, as a second condition, whether the acquired authentication information in the second information processing system is identical to the accepted second authentication information, and a setting unit configured not to set the correspondence information as single sign-on setting information in response to the confirmation unit confirming that at least any one of the conditions is not satisfied, and to set the correspondence information as single sign-on setting information in response to the confirmation unit confirming that both the first condition and the second condition are satisfied.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A and 3B are general SSO login flows in which SSO mapping setting is used.

FIGS. 6A to 6C are examples of first and second ID lists and SSO mapping setting information according to an exemplary embodiment.

FIGS. 7A to 7C are SSO mapping setting flows according to an exemplary embodiment.

FIG. 8 is a diagram illustrating an SSO mapping setting status according to an exemplary embodiment.

FIGS. 14A and 14B are SSO mapping setting flows according to the fourth exemplary embodiment.

FIGS. 15A and 15B are example SSO mapping setting screens according to an exemplary embodiment.

DESCRIPTION OF THE EMBODIMENTS

Various exemplary embodiments, features, and aspects of the invention will be described in detail below with reference to the drawings.

The present invention is directed to the setting of SSO mapping between proper IDs among the services that support authentication cooperation.

Figure 1:
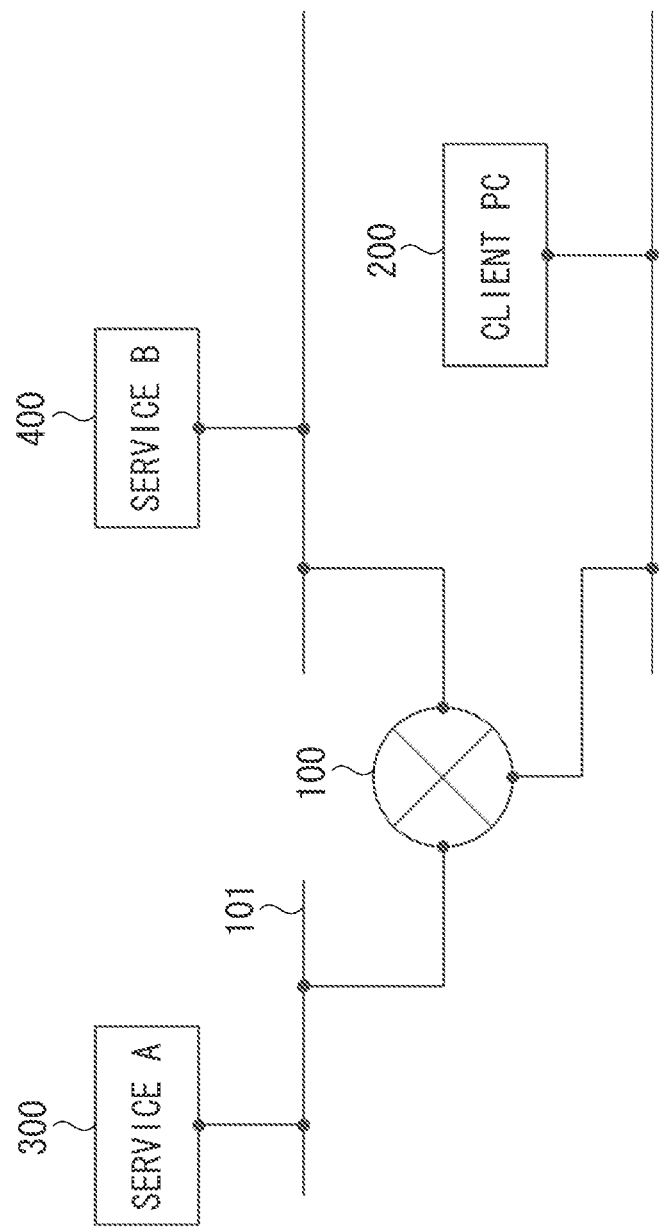
FIG. 1 is a diagram illustrating a network configuration.

The following describes exemplary embodiments with reference to the drawings. An authority transfer system in the present exemplary embodiment is implemented on a network with a configuration illustrated in FIG. 1.

In the embodiments, the world wide web (WWW) system is used as a wide area network (WAN) 100. A local area network (LAN) 101 connects various components to each other. The devices and systems can communicate with each other via the LAN.

The user operates a client personal computer (PC) 200. Service A 300 and service B 400 provide services after authenticating the user.

The client PC 200, service A 300, and service B 400 are connected via the WAN network 100 and the LAN 101. The client PC 200 and the services may be configured on different LANs or on the same LAN. The client PC 200 and the services may also be configured on the same PC.

The service A 300 and service B 400 are equivalent to a server A 300 and a server B 400, respectively. The service provided on each server is provided by a server computer described below. The provided service is, for example, a service for providing user information stored in a database and the print service.

The service A 300 corresponds to a second information processing system, and the service B 400 corresponds to a first information processing system. Each of the service A 300 and the service B 400 may be a single server or a server group configured by a plurality of servers.

First, the service A 300 accepts a user login. Next, when an SSO mapping setting request is accepted from the user, the service A 300 accesses the service B 400 using service B authentication information included in the SSO mapping setting request. If the authentication information is valid, the service B 400 transfers a second ID list 460, which can be acquired by the user authority identified by the authentication information, to the service A 300.

In a first exemplary embodiment, the user of a predetermined tenant, who has administrator authority in the service A 300 and service B 400, accesses the service A 300 to acquire the ID list from the service B 400. When acquiring the second ID list 460, the service A 300 uses the application programming interface (API), which is published by the service B 400, to acquire a second ID list 460. Furthermore, the service A 300 acquires a first ID list 360 that can be acquired with the authority of the login user.

The service A 300 performs SSO mapping setting using the first ID list 360, second ID list 460, and SSO mapping setting information 500 included in the SSO mapping setting request.

The authentication information received from the client includes at least the user ID. The service A 300 acquires an ID list from other services based on this authentication information. Since the user ID is included also in the ID list, the system is configured to acquire a plurality of pieces of authentication information from other services based on the authentication information received from the client.

The received authentication information according to the first exemplary embodiment includes the user ID and the password. The authentication information acquired from other services includes only the user ID. However, there is no limit on the form of the received authentication information and acquired authentication information.

Figure 2:
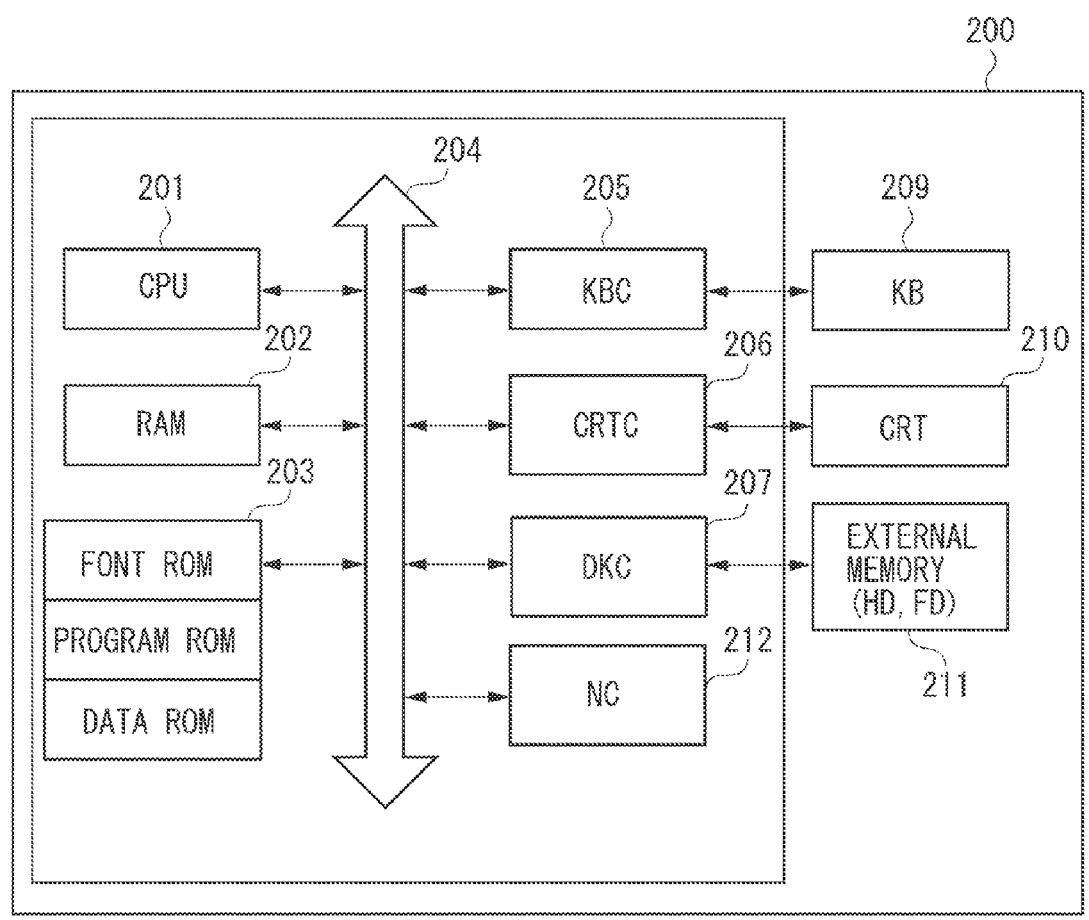
FIG. 2 is a configuration diagram of a PC according to an exemplary embodiment.

FIG. 2 is a diagram illustrating a configuration of the client PC 200 in the present exemplary embodiment. The server computer providing the service A 300 and the service B 400 has the same configuration.

The hardware block diagram illustrated in FIG. 2 corresponds to the hardware block diagram of a general information processing device. The client PC 200 and the server computer in the present exemplary embodiment may have the hardware configuration of a general information processing device.

In FIG. 2, a central processing unit (CPU) 201 executes programs such as the operating system (OS) or applications stored in the program read only memory (ROM) of a ROM 203 or loaded from a hard disk 211 into a random access memory (RAM) 202.

The processing of each flowchart is implemented by executing these programs. The RAM 202 functions as a main memory and a work area of the CPU 201. A keyboard controller (KBC) 205 controls a key input from a keyboard (KB) 209 or a pointing device (not illustrated).

A cathode ray tube (CRT) controller 206 controls the display of a CRT display 210. A disk controller (DKC) 207 controls data access to the hard disk (HD) 211 or a floppy (registered trademark) disk (FD) in which various types of data are stored. An NC 212, connected to the network, executes communication control processing with other devices connected to the network.

Unless otherwise stated, the main component of the hardware for executing control is the CPU 201, and the main component of the software is the application programs installed on the hard disk (HD) 211, throughout the description below.

FIG. 3A and FIG. 3B are login flows of the general SSO in which SSO mapping setting is used. In the present exemplary embodiment, the service B 400 operates as an IdP, and the service A 300 operates as an SP. However, the service A 300 may operate as an IdP, and the service B 400 may operates as an SP.

When the service B 400 is an IdP, the user, once authenticated by the service B 400, may access the service A 300 without being authenticated by the service A 300. Therefore, the user can receive the service without having to transmit the authentication information to the service A 300.

In the following example, the flow will be described in which the user of client PC 200 accesses the service B 400 as a user access via a user access request and the service B user ID is first authenticated by the service B 400. After that, the user receives the service of the service A 300 via SSO. Another flow is also possible in which the user accesses the service A 300, the user access is redirected to the service B 400 and, after receiving authentication by the service B 400, the user receives the service of the service A 300.

FIG. 3A is a diagram illustrating an IdP side flow of the general SSO login flow. In the present exemplary embodiment, the service B 400 is the IdP. In step S1, the service B 400 accepts an authentication request from a user who wants to receive the service of the service A 300. In this step, the service B 400 receives the ID and the password of the service B 400 required for the user to be authenticated by the service B 400. FIG. 15B illustrates an example of a screen for the user of client PC 200 to enter the IdP ID and the IdP password of the service B 400.

In step S2, the service B 400 checks whether the combination of the ID and the password of the service B, accepted from the user in step S1, is valid. If the combination is valid (YES in step S2), the processing proceeds to step S3. If the combination is not valid (NO in step S2), the service B 400 ends the flow.

In step S3, the service B 400 authenticates the user and redirects the user access to the service A 300. At that time, the access information, which has been passed at the redirect time, includes the ID of the user the service B 400 has authenticated. After the access is redirected by the service B 400, the service B 400 ends the flow. The access information corresponds to the authentication token.

FIG. 3B is a diagram illustrating an SP side flow of the general SSO login flow. In the present exemplary embodiment, the service A 300 is the SP.

In step S4, the service A 300 accepts (e.g., receives) the user access redirected by the service B 400 at step S3. In step S5, the service A 300 obtains, from the access information received in step S4, the service B user ID of the user of client PC 200, where the service B user ID has been authenticated by the service B 400.

In step S6, the service A 300 performs SSO mapping service on the authenticated service B user ID obtained in step S5 to obtain an SSO mapping setting. The SSO mapping service is discussed in connection with FIGS. 7A, 7B, and 7C, which are flowcharts illustrating the SSO mapping setting flow according to an exemplary embodiment. FIG. 8 illustrates an SSO mapping setting 501 between AX001 and BX001, and an SSO mapping setting 502 between AX002 and BX002. In step S7 of FIG. 3B, the service A 300 determines whether the SSO mapping setting is obtained/found in step S6. If the SSO mapping setting is not found (NO in step S7), the service A 300 ends the flow. If the SSO mapping setting is found (YES in step S7), the processing proceeds to step S8. Here, for example, the SSO mapping setting 501 between AX001 and BX001 of FIG. 8 mapped the service B user ID of the user to the service A user ID of that same user such that the SSO mapping setting 501 indicates the service A user ID of the service A 300.

In step S8, the service A 300 authenticates the user of client PC 200 using the service A user ID of the service A 300 indicated by the SSO mapping setting found in step S6. The service A 300 then allows the user access request received in step S4 from the service B 400, provides, to the user of client PC 200, the service requested by the user of client PC 200 via the user access request received in step S4 from the service B 400, and ends the FIG. 3A/FIG. 3B flow.

As described above, when the user SSO mapping is set (YES in step S7), the user of client PC 200 can receive the service provided by the service A 300 by first passing the service B user ID, the service B user password of the service B 400, and a request to use a service of the service A 300 to the service B 400 at step S1.

Figure 4A:
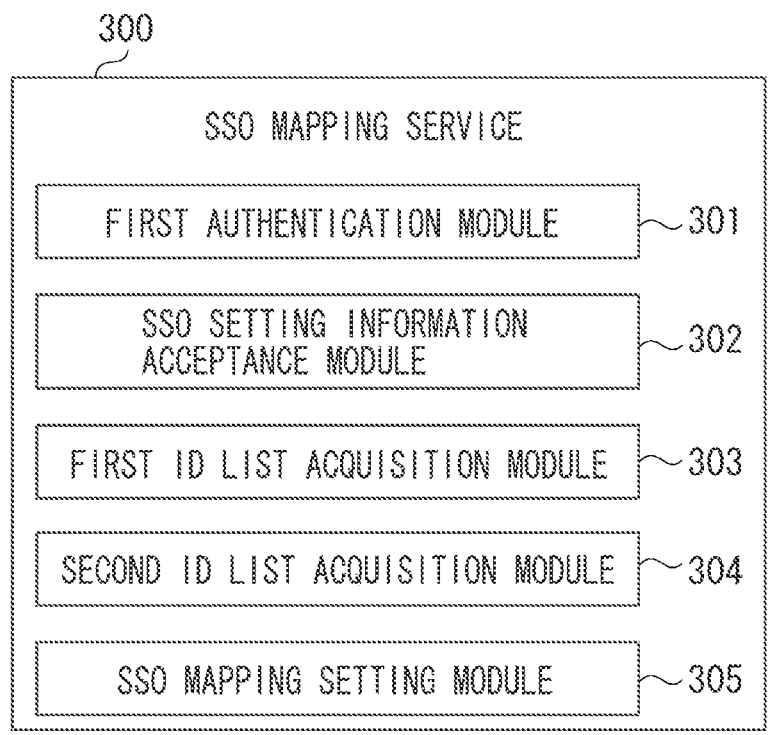
FIGS. 4A and 4B are module configuration diagrams according to an exemplary embodiment.
Figure 4B:
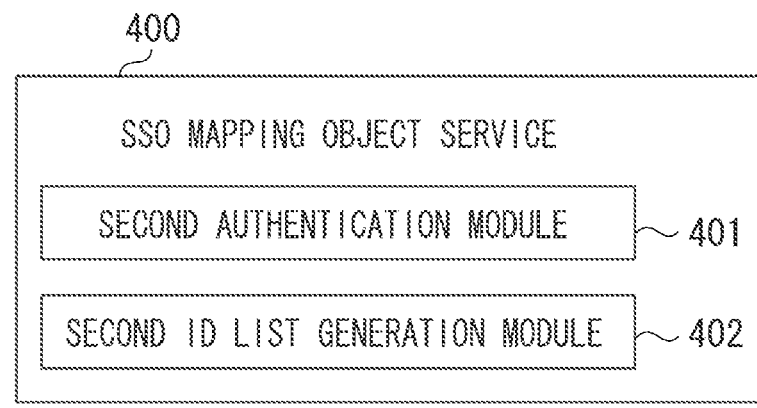

FIGS. 4A and 4B are module configuration diagrams according to an exemplary embodiment. Although the service A 300 is the SSO mapping service and the service B 400 is the SSO mapping object service, the service correspondence relationship is not limited thereto described above. The modules illustrated in FIGS. 4A and 4B are stored on the HDD as described above. These modules are loaded into the memory for execution by the CPU to implement their functions.

FIG. 4A is a module configuration diagram illustrating the SSO mapping service 300 in an exemplary embodiment. The SSO mapping service 300 includes a first authentication module 301, an SSO setting information acceptance module 302, a first ID list acquisition module 303, a second ID list acquisition module 304, and an SSO mapping setting module 305.

The SSO mapping setting module 305 compares the first authentication information included in the first ID list 360 and the first authentication information included in the SSO mapping setting information 500, and compares the second authentication information included in the second ID list 460 and the second authentication information included in the SSO mapping setting information 500, to perform SSO mapping setting. The details of the SSO mapping setting information will be described below. The SSO mapping setting information corresponds to the single sign-on mapping table.

FIG. 4B is a module configuration diagram illustrating an SSO mapping object service 400 according to an exemplary embodiment. The SSO mapping object service 400 includes a second authentication module 401 and a second ID list generation module 402.

The second ID list generation module 402 has the API that transfers the second ID list 460 in response to an ID list generation request. When an ID list generation request is accepted from the SSO mapping service 300, the second ID list generation module 402 generates the second ID list 460 as the list of IDs that can be acquired by the authority of the user authenticated by the second authentication module 401 and transfers the generated second ID list 460.

Figure 5A:
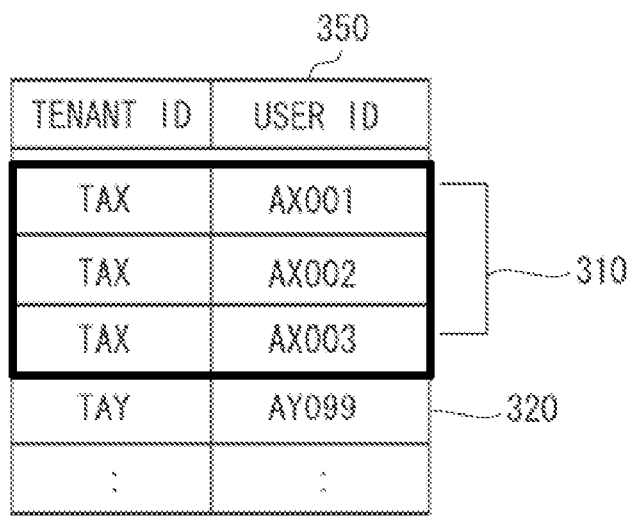
FIGS. 5A and 5B are examples of tenant-based user list data according to an exemplary embodiment.
Figure 5B:
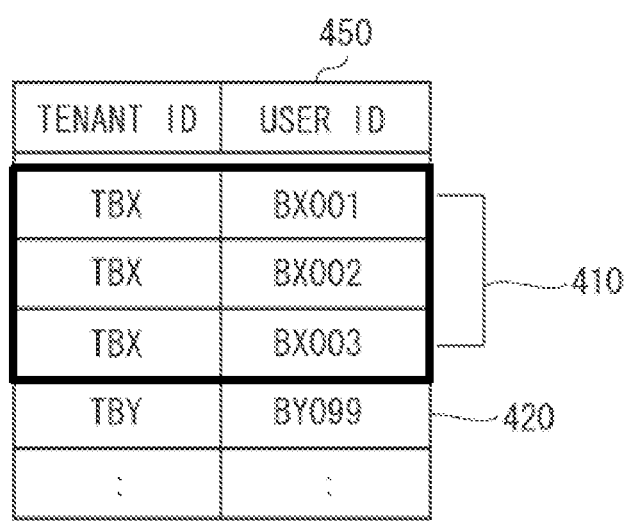

FIGS. 5A and 5B are examples of tenant-based, or group-based, user list data according to an exemplary embodiment. A tenant ("T") can be characterized by a company (e.g., A or B) and a group (e.g., X or Y) within that company. FIG. 5A illustrates tenant-based user list data 350 for a company A managed by the SSO mapping service 300. FIG. 5B illustrates tenant-based user list data 450 for a company B managed by the SSO mapping object service 400.

The FIG. 5A data example illustrates that the SSO mapping service 300 for company A has two tenants (i.e., TAX 310 and TAY 320), where company A, group X users 001 002, and 003, e.g., AX001, AX002, and AX003, belong to the tenant ("T") TAX, and a company A, group Y user 099, e.g. AY099, belongs to the tenant TAY.

The FIG. 5B data example illustrates that the SSO mapping object service 400 has two tenants (i.e., TBX 410 and TBY 420), where users BX001, BX002, and BX003 belong to the tenant TBX, and a user BY099 belongs to the tenant TBY.

In a first exemplary embodiment, it is assumed that the user of client PC 200 is an administrator of a predetermined tenant and wants to perform single sign-on setting collectively for the general users of the tenant (e.g., for the general users of a group within a company) to which the user of client PC 200 belongs. In the first exemplary embodiment, user BX001 is an administrator who has administrative authority to receive the service of the service A 300 collectively on behalf of the general users BX001, BX002, and BX003 of group TBX to which administrator user BX001 belongs.

As described above, specific information is related to each piece of authentication information, i.e., a user ID, that makes up authentication information, e.g., an ID list. The specific information is tenant information. The user of client PC 200 having administrator authority can acquire the user's own authentication information and other authentication information, such as ID lists related to the same specific information, as permitted by the authority.

FIGS. 6A, 6B, and 6C are diagrams illustrating first authentication information (ID list 360), second authentication information (ID list 460), and SSO mapping setting information 500 according to an exemplary embodiment.

The first ID list 360 is a user ID list that the first ID list acquisition module 303 of the service A 300 has acquired from the service A 300 by the authority of the user AX001 belonging to the tenant TAX. The second ID list 460 is a user ID list that the second ID list acquisition module 304 of the service A 300 has acquired from the service B 400 by the authority of the user BX001 belonging to the tenant TBX.

The SSO mapping setting information 500 is SSO mapping setting information to perform a single sign-on setting for AX001 and BX001, having administrator authority, and for AX002 and BX002, a user in the same company and group as the user with the administrator authority.

Figure 7B:
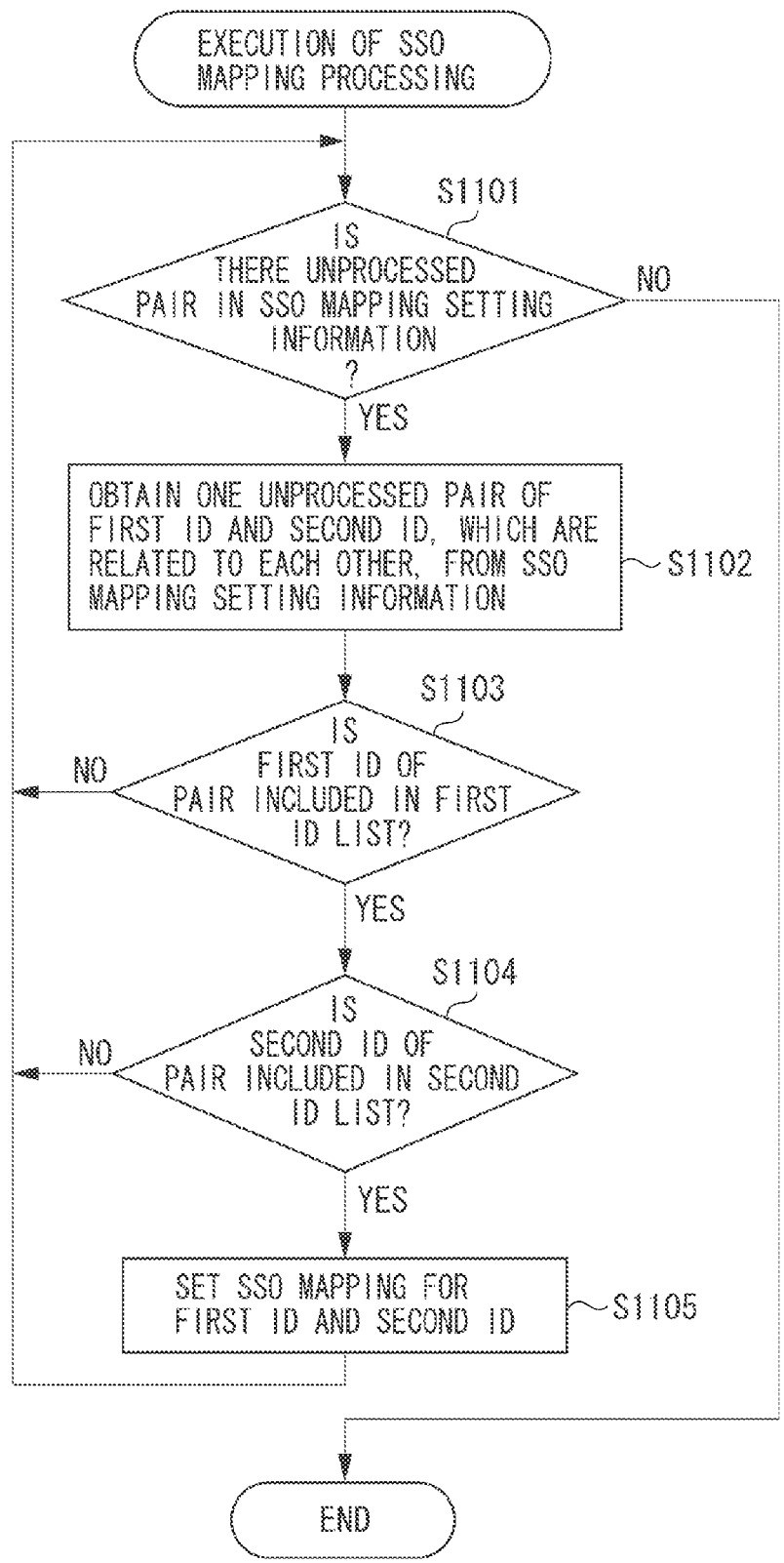

FIGS. 7A, 7B, and 7C are flowcharts illustrating the SSO mapping setting flow according to an exemplary embodiment. FIGS. 7A and 7B illustrate the flow of the SSO mapping service 300. FIG. 7C illustrates the flow of the SSO mapping object service 400.

FIG. 7A is a flowchart illustrating the SSO mapping setting flow in the SSO mapping service 300 according to an exemplary embodiment. This flow begins when the SSO mapping service 300 is accessed by the user who wants to set an SSO mapping.

In step S1001, the first authentication module 301 accepts the first ID and the first password, which will be used for authentication by the SSO mapping service 300, from the user who accesses the SSO mapping service 300.

In step S1002, the first authentication module 301 determines whether the combination of the first ID and the first password, accepted in step S1001, is valid. If the combination is valid (YES in step S1002), the processing proceeds to step S1003. If the combination is not valid (NO in step S1002), the first authentication module 301 rejects the user access, and ends the flow.

In step S1003, the first authentication module 301 allows login to the SSO mapping service 300 as the first ID accepted from the user. In the description below, it is assumed that the user ID is AX001.

In step S1004, the SSO setting information acceptance module 302 accepts the second ID and the second password from the user. FIG. 15A illustrates an example of the screen for the user to enter the second ID and the second password.

In step S1005, the SSO setting information acceptance module 302 accepts the SSO mapping setting information 500 from the user. FIG. 15A illustrates an example of the screen for the user to enter the SSO mapping setting information 500. In the description below, it is assumed that as the SSO mapping setting information 500, the SSO mapping setting information is described in each of the combination of AX001 and BX001, and the combination of AX002 and BX002.

In step S1006, the second ID list acquisition module 304 uses the second ID and the second password accepted from the user in step S1004, to request the second ID list generation API, which is published by the SSO mapping object service 400, to generate an ID list.

As the response, the second ID list acquisition module 304 receives the second ID list 460 from the SSO mapping object service 400. The second ID list 460 acquired in this step is an ID list in the range that can be acquired by the authority of the user indicated by the second ID. In the first exemplary embodiment, it is assumed that this list is an ID list that can be acquired in the range of the administrator authority and that BX001 is used as the second ID to acquire the second ID list 460.

It is also assumed that the acquired second ID list includes BX001, BX002, and BX003.

In step S1007, the first ID list acquisition module 303 acquires the first ID list 360. The first ID list 360 acquired in this step is an ID list in the range that can be acquired by the authority of the first ID authenticated in step S1003. It is assumed that AX001 is used as the first ID to acquire the first ID list 360. In this case, the list of IDs belonging to the tenant, to which AX001 belongs, is acquired. It is assumed that the acquired first ID list 360 includes AX001, AX002, and AX003.

In step S1008, the SSO mapping setting module 305 uses the first ID list 360, second ID list 460, and SSO mapping setting information 500 to perform SSO mapping setting, and then ends the SSO mapping setting flow.

FIG. 7B is a diagram illustrating a detailed flow of SSO mapping setting performed by the SSO mapping setting module 305 according to an exemplary embodiment. This flow is the detailed flow of the processing in step S1008 of the SSO mapping setting flow performed by the SSO mapping service 300.

In step S1101, the SSO mapping setting module 305 determines whether there is an unprocessed combination in the SSO mapping setting information 500 acquired in step S1005. If there is no unprocessed combination (NO in step S1101), the SSO mapping setting module 305 ends the detailed flow of SSO mapping setting. If there is an unprocessed combination (YES in step S1101), the processing proceeds to step S1102.

In step S1102, the SSO mapping setting module 305 obtains one combination of a first ID and a second ID, which are related to each other, from the SSO mapping setting information 500. In the description below, it is assumed that the combination of AX001 and BX001 is obtained.

This combination corresponds to the correspondence information. The single sign-on mapping table including a plurality of pieces of correspondence information is the SSO mapping setting information 500.

In step S1103, the SSO mapping setting module 305 determines whether the first ID, which is included in the combination obtained in step S1102, is included in the first ID list 360 acquired in step S1007.

If it is determined that the first ID is included, that is, if it is determined that the same ID is included (YES in step S1103), the processing proceeds to step S1104. If it is determined that the first ID is not included, that is, if it is determined that the same ID is not included in the correspondence information (NO in step S1103), the SSO mapping setting module 305 does not perform SSO mapping setting for the combination obtained in step S1102, and the processing proceeds to step 1101. In this example, because AX001 included in the combination obtained in step S1102 is included also in the first ID list 360, the processing proceeds to step S1104.

In step S1104, the SSO mapping setting module 305 determines whether the second ID, which is included in the combination obtained in step S1102, is included in the second ID list 460 acquired in step S1006.

If it is determined that the second ID is included (YES in step S1104), the processing proceeds to step S1105. If it is determined that the second ID is not included (NO in step S1104), the SSO mapping setting module 305 does not perform SSO mapping setting for the combination obtained in step S1102, and the processing proceeds to step S1101.

In this example, because BX001 included in the combination obtained in step S1102 is included also in the second ID list 460, the processing proceeds to step S1105.

In step S1105, the SSO mapping setting module 305 sets SSO mapping for the combination of the first ID and the second ID obtained in step S1102. After that, the processing proceeds to step S1101. In this example, SSO mapping is set for the combination of AX001 and BX001.

As described above, the SSO mapping service 300 checks whether the authentication information (user ID) acquired based on the authentication information received from a client matches one of authentication information described in the single sign-on mapping table for each piece of the correspondence information.

Based on this confirmation, the SSO mapping service 300 determines whether the correspondence information in the single sign-on mapping table is to be set as the single sign-on setting information.

FIG. 7C is a flowchart illustrating a second ID list generation flow of the SSO mapping object service 400 according to an exemplary embodiment. This flow begins when the SSO mapping object service 400 receives a second ID list generation request from the SSO mapping service 300.

In step S2001, the second authentication module 401 of the SSO mapping object service 400 accepts a second ID list generation request from the SSO mapping service 300.

In step S2002, the second authentication module 401 determines whether the combination of the second ID and the second password included in the second ID list generation request is valid. If it is determined that the combination is valid (YES in step S2002), the processing proceeds to step S2003. If it is determined that the combination is not valid (NO in step S2002), the SSO mapping object service 400 does not transfer the second ID list to the SSO mapping service 300, and ends the flow.

In step S2003, the second ID list generation module 402 generates the second ID list 460. The second ID list 460 generated in this step is an ID list in the range that can be acquired by the authority of the second ID authenticated in step S2002. In the description below, it is assumed that BX001 is used as the second ID to acquire the second ID list 460.

In this case, the second ID list generation module 402 acquires the list of IDs belonging to the tenant, to which BX001 belongs, and generates the second ID list 460 that includes BX001, BX002, and BX003. In step S2004, the second ID list generation module 402 returns the second ID list 460, generated in step S2003, to the SSO mapping service 300, and ends the flow.

FIG. 8 is a diagram illustrating the SSO mapping setting status according to an exemplary embodiment. The service A 300, which is the SSO mapping service, includes a tenant TAX 310 and a tenant TAY 320. The tenant TAX 310 includes user IDs AX001, AX002, and AX003.

The tenant TAY 320 includes user ID AY099. The SSO mapping object service 400, which is the SSO mapping object service, includes a tenant TBX 410 and a tenant TBY 420. The tenant TBX 410 includes user IDs BX001, BX002, and BX003.

The tenant TBY 420 includes the user ID BY099. A company X tenant group 601 indicates the tenant group of company X in the service A 300 and service B 400. A company Y tenant group 602 indicates the tenant group of company Y in the service A 300 and service B 400.

Executing the flows illustrated in FIGS. 7A, 7B, and 7C results in an SSO mapping setting 501 between AX001 and BX001, and an SSO mapping setting 502 between AX002 and BX002. These SSO mapping settings are appropriate SSO mapping settings because these SSO mappings are those in the company X tenant group 601.

On the other hand, an SSO mapping 599 between the company X tenant group 601 and the company Y tenant group 602, such as AX003 and BY099, is an inappropriate SSO mapping setting. The flows illustrated in FIGS. 7A, 7B, and 7C prevent such an SSO mapping from being set.

Conventionally, Japanese Patent Application Laid-Open No. 2004-234329 discusses a system in which an SSO mapping server is used. This SSO mapping server creates an SP ID in advance and saves the created SP ID without assigning it to the user. When the user passes the ID and password to the IdP and the authentication is successful, the SSO mapping server of JP 2004-234329 assigns the SP account newly to the user. In contrast, the present exemplary embodiment allows an SSO mapping to be set for an SP ID that the user of client PC 200 already has.

The present exemplary embodiment allows the administrator in the tenant of a company, who sets an SSO mapping on behalf of the users, to set an SSO mapping even if the administrator does not know the password of each user. In addition, when setting an SSO mapping, the present exemplary embodiment prevents an SSO mapping from being set mistakenly for IDs included in the tenants of different companies.

Next, a second exemplary embodiment will be described with reference to the drawings. For the components identical to those in the first exemplary embodiment, the descriptions are omitted. Only the different portions are described below.

Figure 9:
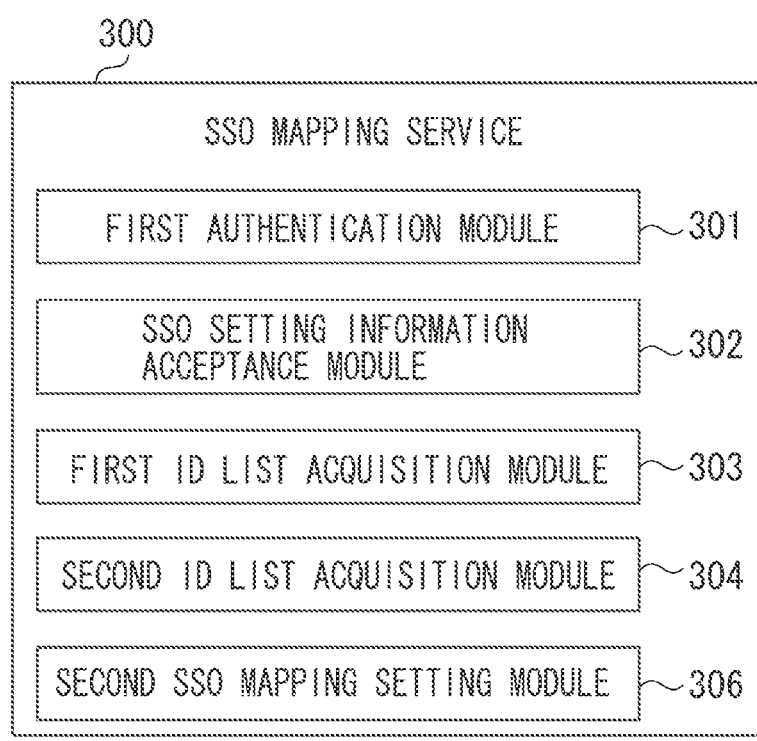
FIG. 9 is a module configuration diagram according to a second exemplary embodiment.

FIG. 9 is a configuration diagram illustrating a module of the SSO mapping service 300 in the second exemplary embodiment. The SSO mapping service 300 includes a first authentication module 301, an SSO setting information acceptance module 302, a first ID list acquisition module 303, a second ID list acquisition module 304, and a second SSO mapping setting module 306.

If an SSO mapping setting for the same ID is already set when an SSO mapping is set, the second SSO mapping setting module 306 overwrites the old setting with a new SSO mapping setting to update the single sign-on setting.

Figure 10:
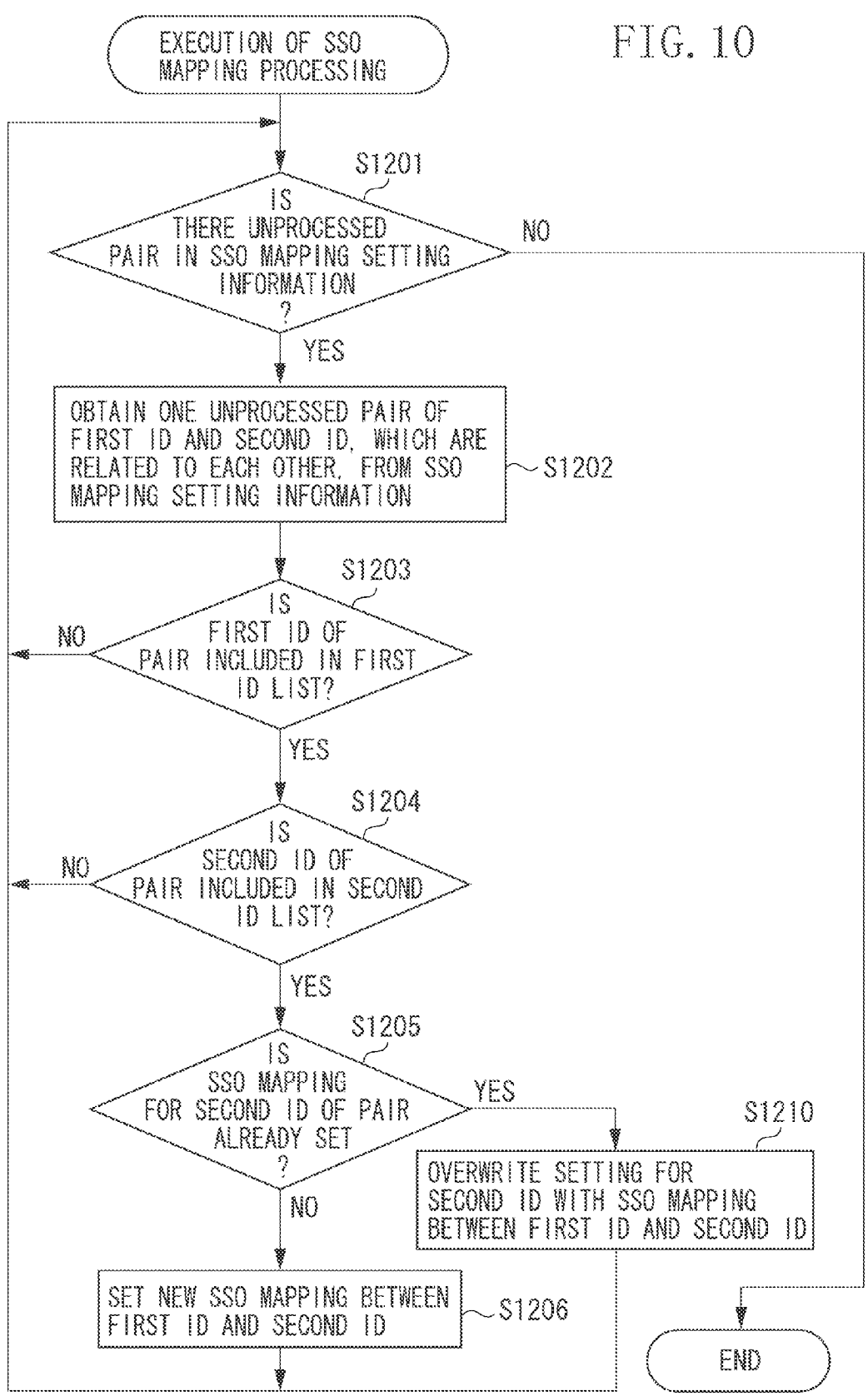
FIG. 10 is an SSO mapping setting flow according to the second exemplary embodiment.

FIG. 10 is a flowchart illustrating a detailed flow of SSO mapping setting performed by the second SSO mapping setting module 306 according to an exemplary embodiment. This flow is the detailed flow of the processing in step S1008 of the SSO mapping setting flow performed by the SSO mapping service 300.

In step S1201, the second SSO mapping setting module 306 determines whether there is an unprocessed combination in the SSO mapping setting information 500 acquired in step S1005. If there is no unprocessed combination (NO in step S1201), the second SSO mapping setting module 306 ends the detailed flow of SSO mapping setting. If there is an unprocessed combination (YES in step S1201), the processing proceeds to step S1202.

In step S1202, the second SSO mapping setting module 306 obtains one combination of a first ID and a second ID, which are related to each other, from the SSO mapping setting information 500. In the description below, it is assumed that the combination of AX001 and BX001 is obtained.

In step S1203, the second SSO mapping setting module 306 determines whether the first ID, included in the combination obtained in step S1202, is included in the first ID list 360 acquired in step S1007.

If it is determined that the first ID is included (YES in step S1203), the processing proceeds to step S1204. If it is determined that the first ID is not included (NO in step S1203), the second SSO mapping setting module 306 does not perform SSO mapping setting for the combination obtained in step S1202, and the processing proceeds to step 1201.

In this example, because AX001 included in the combination obtained in step S1202 is included also in the first ID list 360, the processing proceeds to step S1204.

In step S1204, the second SSO mapping setting module 306 determines whether the second ID, which is included in the combination obtained in step S1202, is included in the second ID list 460 acquired in step S1006.

If it is determined that the second ID is included (YES in step S1204), the processing proceeds to step S1205. If it is determined that the second ID is not included (NO in step S1204), the second SSO mapping setting module 306 does not perform SSO mapping setting for the combination obtained in step S1202, and the processing proceeds to step S1201. In this example, because BX001 included in the combination obtained in step S1202 is included also in the second ID list 460, the processing proceeds to step S1205.

In step S1205, the second SSO mapping setting module 306 determines whether the SSO mapping for the combination of the first ID and the second ID, which is obtained in step S1202, is already set. In other words, the second SSO mapping setting module 306 checks whether the new correspondence information includes the authentication information already used for the single sign-on setting information.

If it is determined as the result of the determination that SSO mapping is not set (NO in step S1205), the processing proceeds to step S1206. If the SSO mapping is set (YES in step S1205), the processing proceeds to step S1210.

In this example, the second SSO mapping setting module 306 checks whether the SSO mapping for the first ID is already set and overwrites the SSO mapping with a new setting. However, the ID used for checking whether the SSO mapping is already set is not limited to the first ID. The second SSO mapping setting module 306 may use the second ID or both the first ID and the second ID.

In step S1206, the second SSO mapping setting module 306 sets the new SSO mapping for the combination of the first ID and the second ID obtained in step S1202, and the processing proceeds to step S1201. In this case, the SSO mapping is set for the combination of AX001 and BX001.

In step S1210, the second SSO mapping setting module 306 overwrites the SSO mapping setting, which is determined in step S1205 that it is already set, with the combination of the first ID and the second ID obtained in step S1202. When the setting is finished, the processing proceeds to step S1201.

In this example, it is assumed that the SSO mapping is already set for AX001 and BX003 in step S1205. Because the SSO mapping setting information 500 for the combination of the AX001 and BX001 is acquired in step S1202, the second SSO mapping setting module 306 releases the SSO mapping of AX001 and BX003. Instead, the second SSO mapping setting module 306 sets the SSO mapping for the combination of AX001 and BX001.

The present exemplary embodiment allows the user to overwrite an SSO mapping setting, which is already set, with a new SSO mapping setting. When setting SSO mappings collectively, the administrator in the tenant of a company can set a new SSO mapping setting without worrying about an SSO mapping setting that is already set, thereby increasing convenience. When overwriting SSO mappings collectively, the user can easily overwrite the SSO mappings.

Next, a third exemplary embodiment will be described with reference to the drawings. For the components identical to those in the first exemplary embodiment, the descriptions are omitted. Only the different portions are described below.

Figure 11:
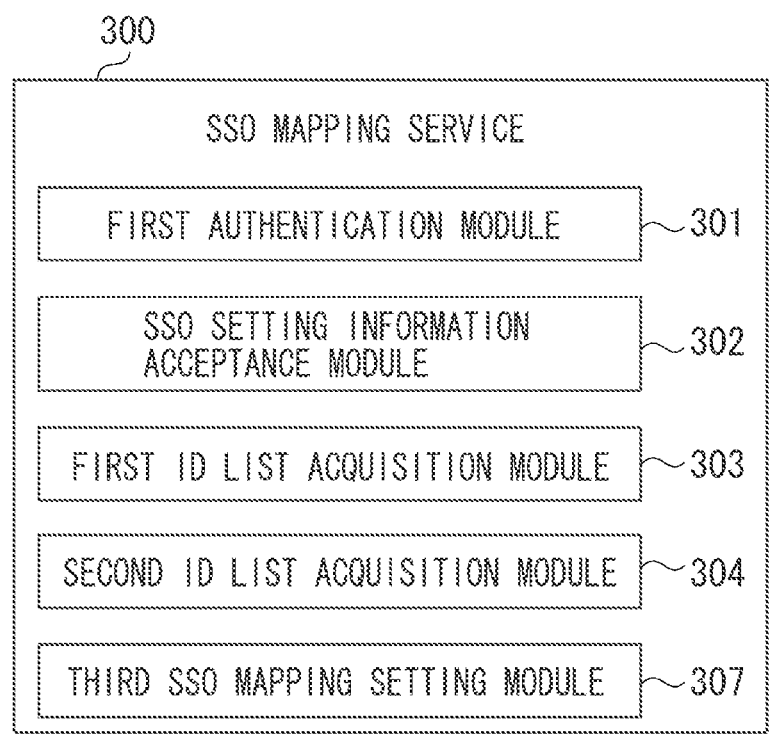
FIG. 11 is a module configuration diagram according to a third exemplary embodiment.

FIG. 11 is a module configuration diagram illustrating the SSO mapping service 300 according to the third exemplary embodiment. The SSO mapping service 300 includes a first authentication module 301, an SSO setting information acceptance module 302, a first ID list acquisition module 303, a second ID list acquisition module 304, and a third SSO mapping setting module 307.

If one of the first ID and the second ID of the combination thereof, which are described in the SSO mapping setting information 500 when performing SSO mapping setting, is not described, the third SSO mapping setting module 307 releases the SSO mapping setting for the other.

Figure 12:
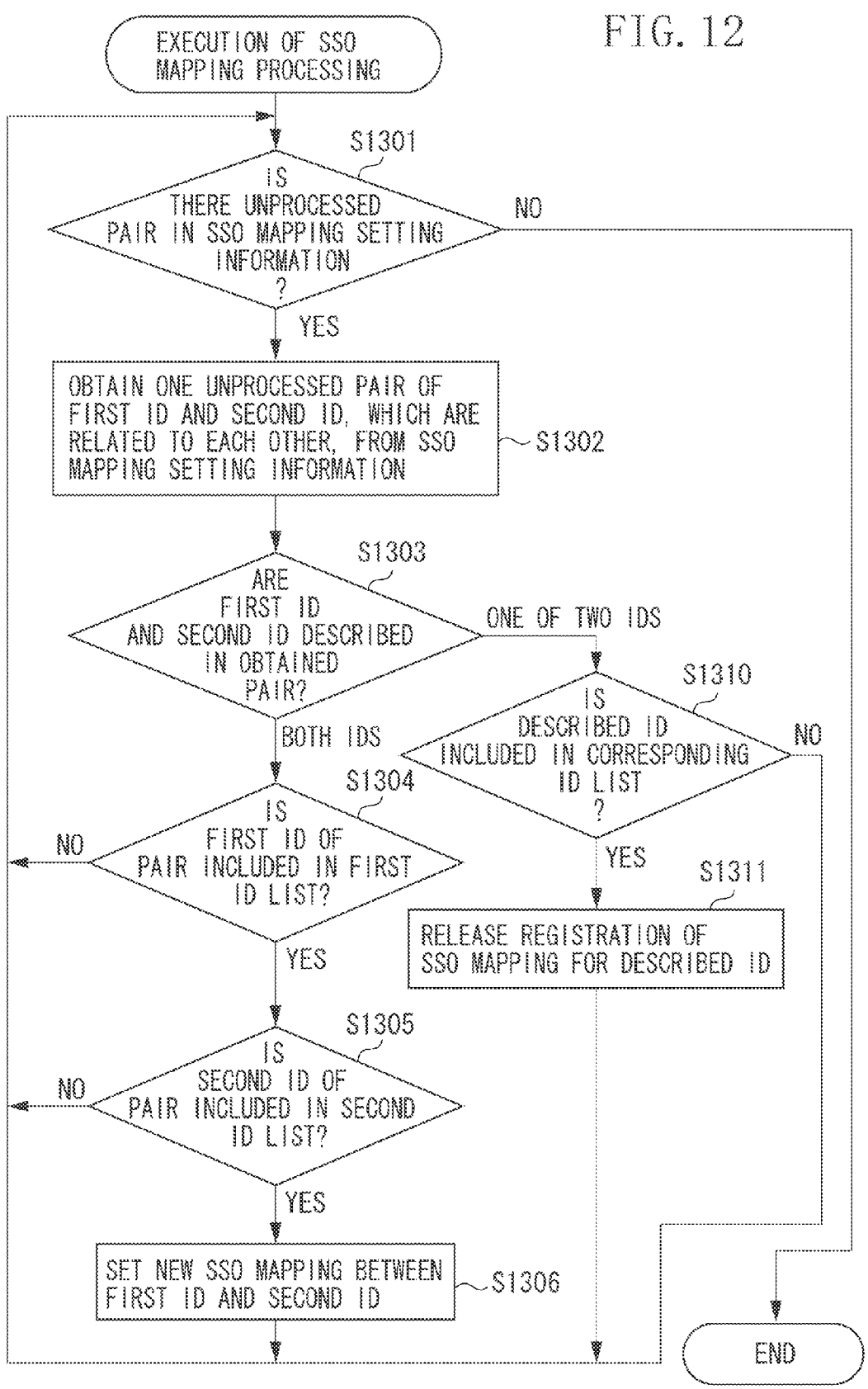
FIG. 12 is an SSO mapping setting flow according to the third exemplary embodiment.

FIG. 12 is a flowchart illustrating a detailed flow of SSO mapping setting performed by the third SSO mapping setting module 307 according to an exemplary embodiment. This flow is the detailed flow of the processing in step S1008 of the SSO mapping setting flow performed by the SSO mapping service 300.

In step S1301, the third SSO mapping setting module 307 determines whether there is an unprocessed combination in the SSO mapping setting information 500 acquired in step S1005. If there is no unprocessed combination (NO in step S1301), the third SSO mapping setting module 307 ends the detailed flow of SSO mapping setting. If there is an unprocessed combination (YES in step S1301), the processing proceeds to step S1302.

In step S1302, the third SSO mapping setting module 307 obtains one combination of a first ID and a second ID, which are related to each other, from the SSO mapping setting information 500. In the description below, it is assumed that the combination of AX001 and BX001 is obtained.

In step S1303, the third SSO mapping setting module 307 determines whether both of the first ID and the second ID are included in the combination obtained in step S1302. If both are included (YES in step S1303), the processing proceeds to step S1304. If only one of them is included (NO in step S1303), the processing proceeds to step S1310.

A case in which only one of the first ID and the second ID is included means that information of one of the first authentication information and the second authentication information is left blank. Another case in which only one of the first ID and the second ID is included means that the second authentication information is not related to the first authentication information in the new correspondence information. Of course, a case in which the first authentication information is not related to the second authentication information may be included in the above case.

In step S1304, the third SSO mapping setting module 307 determines whether the first ID, which is included in the combination obtained in step S1302, is included in the first ID list 360 acquired in step S1007.

If it is determined that the first ID is included (YES in step S1304), the processing proceeds to step S1305. If it is determined that the first ID is not included (NO in step S1304), the third SSO mapping setting module 307 does not perform SSO mapping setting for the combination obtained in step S1302, and the processing proceeds to step 1301. In this example, because AX001 included in the combination obtained in step S1302 is included also in the first ID list 360, the processing proceeds to step S1305.

In step S1305, the third SSO mapping setting module 307 determines whether the second ID, which is included in the combination obtained in step S1302, is included in the second ID list 460 acquired in step S1006.

If it is determined that the second ID is included (YES in step S1305), the processing proceeds to step S1306. If it is determined that the second ID is not included (NO in step S1305), the third SSO mapping setting module 307 does not perform SSO mapping setting for the combination obtained in step S1302, and the processing proceeds to step S1301. In this example, because BX001 included in the combination obtained in step S1302 is included also in the second ID list 460, the processing proceeds to step S1306.

In step S1306, the third SSO mapping setting module 307 sets the SSO mapping for the combination of the first ID and the second ID obtained in step S1302, and the processing proceeds to step S1301. In this case, the SSO mapping is set for the combination of AX001 and BX001.

In step S1310, the third SSO mapping setting module 307 determines whether the ID obtained in step S1302 is included in the corresponding ID list that is one of the first ID list 360 and the second ID list 460.

For example, if the ID obtained in step S1302 is the first ID, the third SSO mapping setting module 307 determines whether the ID is included in the first ID list 360.

On the other hand, if the ID obtained in step S1302 is the second ID, the third SSO mapping setting module 307 determines whether the ID is included in the second ID list 460. If it is determined that the ID is included (YES in step 1310), the processing proceeds to step S1311. If it is determined that the ID is not included (NO in step 1310), the processing proceeds to step S1301 without performing any processing.

In step S1311, the third SSO mapping setting module 307 releases the SSO mapping setting that is set for the described ID, either the first ID or the second ID, of the combination obtained in step S1302. When the setting is released, the processing proceeds to step S1301.

The release of a setting refers to the update so that the correspondence information, which has been used for the single sign-on setting information, will no longer be used as the single sign-on setting information.

When releasing an already-set SSO mapping setting, the present exemplary embodiment allows the user to release the setting if the user knows only one of the IDs of the SSO setting. Therefore, even if the IDs used for the SSO mapping setting is already deleted and there is no way to know which ID was used, the present exemplary embodiment allows the user to specify the other ID to release the SSO mapping, thus increasing convenience.

Next, a fourth exemplary embodiment will be described with reference to the drawings. For the components identical to those in the first exemplary embodiment, the descriptions are omitted. Only the different portions are described.

Figure 13:
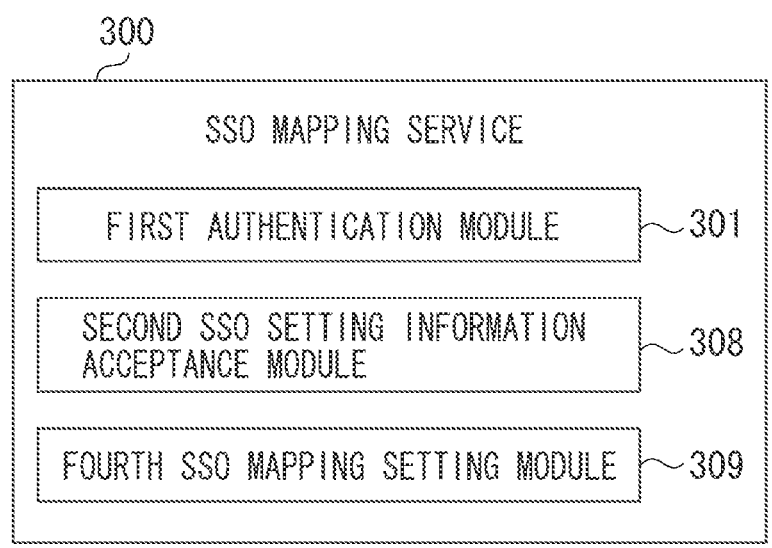
FIG. 13 is a module configuration diagram according to a fourth exemplary embodiment.

FIG. 13 is a module configuration diagram according to the fourth exemplary embodiment. The SSO mapping service 300 includes a first authentication module 301, a second SSO setting information acceptance module 308, and a fourth SSO mapping setting module 309.

The second SSO setting information acceptance module 308 receives the authentication information on the SSO mapping object service 400 from the user, who is trying to log in, and makes an authentication request to the SSO mapping object service 400 for authentication.

After the authentication, the fourth SSO mapping setting module 309 sets an SSO mapping between the ID of the user who is trying to log in to the SSO mapping service 300 and the ID of the SSO mapping object service received by the second SSO setting information acceptance module 308.

Figure 14A:
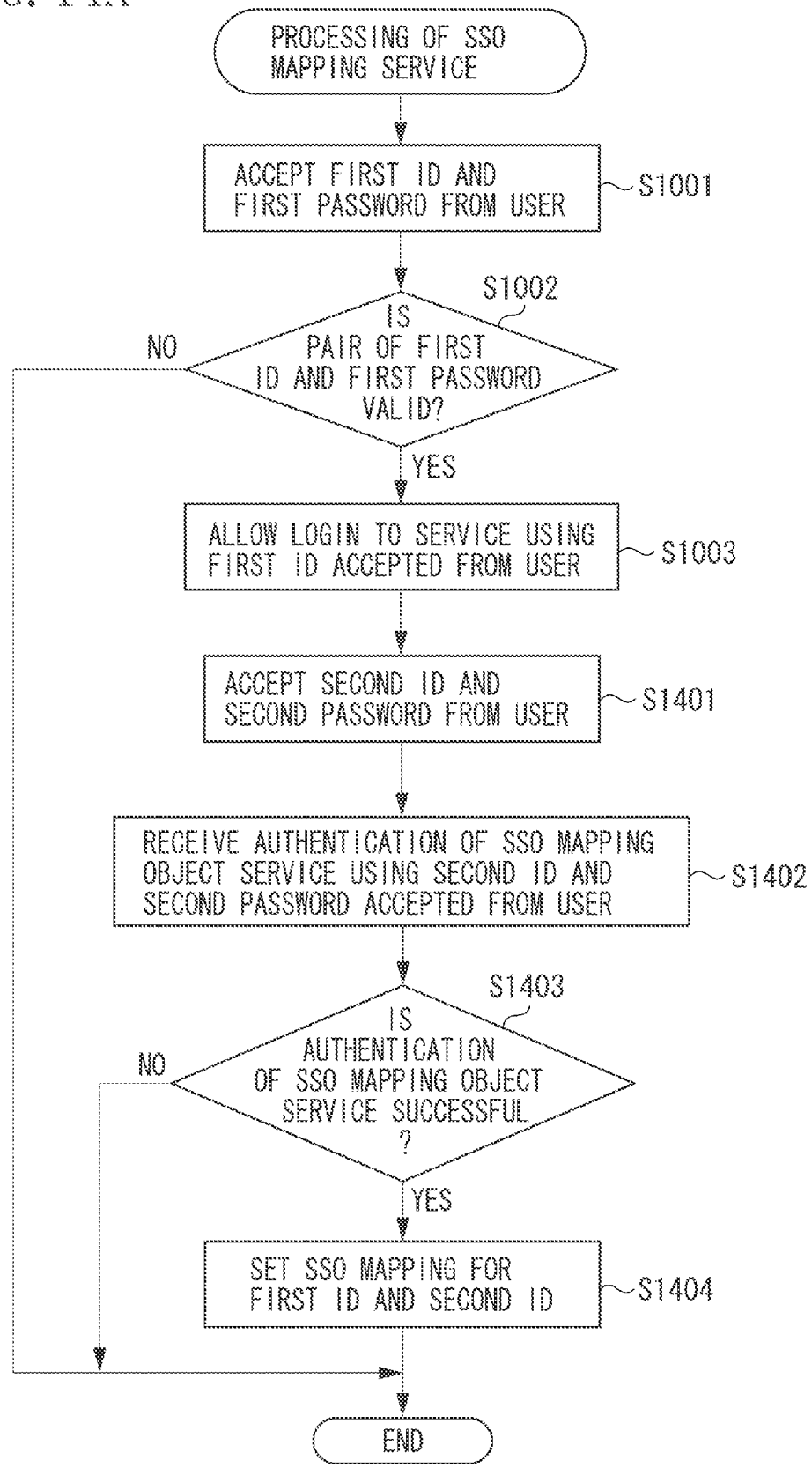

FIG. 14A is a flowchart illustrating an SSO mapping setting flow in the fourth exemplary embodiment. This flow begins when the SSO mapping service 300 is accessed by the user who wants to set an SSO mapping. After allowing the user to log into the service in step 1003, the processing proceeds to step S1401. In the description below, it is assumed that the ID of the user is AX001.

In step S1401, the second SSO setting information acceptance module 308 accepts the second ID and the second password from the user. FIG. 15B illustrates an example of the screen for the user to enter the second ID and the second password.

In step S1402, the fourth SSO mapping setting module 309 uses the second ID and the second password, which are accepted in step S1401, to make an authentication request to the SSO mapping object service 400.

In step S1403, the fourth SSO mapping setting module 309 determines whether the authentication by the SSO mapping object service 400 is successful in step S1402. If the authentication is successful (YES in step S1403), the processing proceeds to step S1404. If the authentication is not successful (NO in step S1403), the fourth SSO mapping setting module 309 does not perform SSO mapping setting, and ends the flow.

In step S1404, the fourth SSO mapping setting module 309 sets an SSO mapping between the first ID accepted in step S1001 and the second ID accepted in step S1401. When the setting is completed, the fourth SSO mapping setting module 309 ends the flow.

FIG. 14B is a diagram illustrating an authentication flow of the SSO mapping object service 400 in the fourth exemplary embodiment. This flow begins when the SSO mapping object service 400 receives an authentication request from the SSO mapping service 300.

In step S2401, the second authentication module 401 performs authentication using the combination of the second ID and the second password included in the authentication request. In step S2402, the second authentication module 401 transfers the authentication result of step S2401 to the SSO mapping service 300 and ends the flow.

The present exemplary embodiment allows a user, who has not the administrator authority, to set an SSO mapping for the user's own existing account, thus reducing the load of the administrator.

FIGS. 15A and 15B are diagrams illustrating examples of the screen for setting an SSO mapping according to an exemplary embodiment. The screen illustrated in FIG. 15A includes a control for receiving the second ID and the second password and a control for selecting a file in which the SSO mapping setting information 500 is described.

Although IdP is included in the screen example because the SSO mapping object service is an IdP in this example, the SSO mapping object service is not limited thereto. In addition, the SSO mapping setting information 500 may also be specified in a form other than a file. FIG. 15B is a diagram illustrating an example of the screen in which the controls for receiving the second ID and the second passwords are included.

Although the exemplary embodiments have been described individually, one system may execute the processing of the exemplary embodiments. For example, one system may execute all exemplary embodiments, from the first to the fourth, or some of the exemplary embodiments, from the first to the third. In such a case, there is no problem because conflict among the processing is least likely to occur.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention. In an example, a computer-readable storage medium may store a program that causes a second information processing system to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-111586 filed May 18, 2011, which is hereby incorporated by reference herein in its entirety.

What is claimed is:

1. A service server to provide a service and communicate with an identity server and a client computer operated by a first user, the service server comprising:
   at least one processor coupled to a memory;
   a reception unit configured to receive, from the client computer as provided by and associated with the first user, a service user identification (ID) and a service user password for the service server, an identity user ID and an identity user password for the identity server, a request for collective users setting of single sign-on, and an access request to receive a service of the service server;
   an acceptance unit configured to receive, from the client computer, single sign-on (SSO) mapping setting information, wherein the SSO mapping setting information includes at least two combinations of a service user ID and an identity user ID, wherein a service user ID and an identity user ID in a combination are related to each other;
   an acquisition unit configured to use the identity user ID, the identity user password, and authority associated with the identity user ID to acquire an identity user ID list from the identity server, and configured to use the service user ID and authority associated with the service user ID to acquire a service user ID list,
   wherein the identity user ID list includes a list of user IDs recognized by the identity server, including the identity user ID and a second identity user ID that is associated with a second user, and belonging to the same identity tenant, and wherein the service user ID list includes a list of user IDs recognized by the service server, including the service user ID and a second service user ID that is associated with the second user, and belonging to the same service tenant; and
   a setting unit configured to use the service user ID list, the identity user ID list, and the SSO mapping setting information to perform SSO mapping processing to determine whether to set a combination of service user ID and identity user ID in the SSO mapping setting information as single sign-on setting information, wherein, for each combination of a service user ID and an identity user ID in the SSO mapping setting information set as part of the single sign-on setting information, the service server provides a user, in the identity tenant and the service tenant and associated with a combination set by the setting unit as part of the single sign-on setting information, to receive access to the service of the service server, even users other than the user associated with the service user ID and the identity user ID who requested the collective users setting of single sign-on, and
   wherein at least one of the reception unit, the acceptance unit, the acquisition unit, and the setting unit are implemented by the at least one processor.

2. The service server according to claim 1, wherein, in response to both the second service user ID being identical to a service user ID in a first combination of the SSO mapping setting information and the second identity user ID being identical to an identity user ID in the first combination, the setting unit sets the first combination of the SSO mapping setting information as part of the single sign-on setting information.

3. The service server according to claim 2, wherein, prior to the setting unit setting the first combination of the SSO mapping setting information as part of the single sign-on setting information, the setting unit determines whether at least one user ID in the first combination already is set as part of the single sign-on setting information,
   wherein, in response to determining that at least one user ID the first combination already is set as part of the single sign-on setting information, the setting unit overwrites existing single sign-on setting information having the at least one user ID with the first combination.

4. The service server according to claim 2, wherein, in response to determining that one of the service user ID and the identity user ID in the first combination is not described, the setting unit releases registration of SSO mapping for the described other of the service user ID and the identity user ID in the first combination in a case where the described other of the service user ID and the identity user ID in the first combination is included in one of the service user ID list, the identity user ID list.

5. The service server according to claim 1, wherein, in response to either the second service user ID not being identical to a service user ID in a first combination of the SSO mapping setting information or the second identity user ID not being identical to an identity user ID in the first combination, the setting unit does not set the first combination of the SSO mapping setting information as part of the single sign-on setting information.

6. A method for a service server to provide a service and communicate with an identity server and a client computer operated by a first user, the method comprising:
   receiving, from the client computer as provided by and associated with the first user, a service user identification (ID) and a service user password for the service server, an identity user ID and an identity user password for the identity server, a request for collective users setting of single sign-on, and an access request to receive a service of the service server;
   receiving, from the client computer, single sign-on (SSO) mapping setting information, wherein the SSO mapping setting information includes at least two combinations of a service user ID and an identity user ID, wherein a service user ID and an identity user ID in a combination are related to each other;
   using the identity user ID, the identity user password, and authority associated with the identity user ID to acquire an identity user ID list from the identity server, and using the service user ID and authority associated with the service user ID to acquire a service user ID list,
   wherein the identity user ID list includes a list of user IDs recognized by the identity server, including the identity user ID and a second identity user ID that is associated with a second user, and belonging to the same identity tenant, and wherein the service user ID list includes a list of user IDs recognized by the service server, including the service user ID and a second service user ID that is associated with the second user, and belonging to the same service tenant; and
   using the service user ID list, the identity user ID list, and the SSO mapping setting information to perform SSO mapping processing to determine whether to set a combination of service user ID and identity user ID in the SSO mapping setting information as single sign-on setting information,
   wherein, for each combination of a service user ID and an identity user ID in the SSO mapping setting information set as part of the single sign-on setting information, the service server provides a user, in the identity tenant and the service tenant and associated with a combination set as part of the single sign-on setting information, to receive access to the service of the service server, even users other than the user associated with the service user ID and the identity user ID who requested the collective users setting of single sign-on, and wherein at least one step is performed by at least one processor coupled to a memory.

7. The method according to claim 6, wherein, in response to both the second service user ID being identical to a service user ID in a first combination of the SSO mapping setting information and the second identity user ID being identical to an identity user ID in the first combination, using to perform SSO mapping processing includes setting the first combination of the SSO mapping setting information as part of the single sign-on setting information.

8. The method according to claim 7, wherein, prior to setting the first combination of the SSO mapping setting information as part of the single sign-on setting information, using to perform SSO mapping processing includes determining whether at least one user ID in the first combination already is set as part of the single sign-on setting information, wherein, in response to determining that at least one user ID the first combination already is set as part of the single sign-on setting information, using to perform SSO mapping processing includes overwriting existing single sign-on setting information having the at least one user ID with the first combination.

9. The method according to claim 7, wherein, in response to determining that one of the service user ID and the identity user ID in the first combination is not described, using to perform SSO mapping processing includes releasing registration of SSO mapping for the described other of the service user ID and the identity user ID in the first combination in a case where the described other of the service user ID and the identity user ID in the first combination is included in one of the service user ID list, the identity user ID list.

10. The method according to claim 6, wherein, in response to either the second service user ID not being identical to a service user ID in a first combination of the SSO mapping setting information or the second identity user ID not being identical to an identity user ID in the first combination, using to perform SSO mapping processing includes not setting the first combination of the SSO mapping setting information as part of the single sign-on setting information.

11. A non-transitory computer-readable storage medium storing a program to cause a service server to perform a method, wherein the service server is to provide a service and communicate with an identity server and a client computer operated by a first user an image forming apparatus, the method comprising:

receiving, from the client computer as provided by and associated with the first user, a service user identification (ID) and a service user password for the service server, an identity user ID and an identity user password for the identity server, a request for collective users setting of single sign-on, and an access request to receive a service of the service server;

receiving, from the client computer, single sign-on (SSO) mapping setting information, wherein the SSO mapping setting information includes at least two combinations of a service user ID and an identity user ID, wherein a service user ID and an identity user ID in a combination are related to each other;

using the identity user ID, the identity user password, and authority associated with the identity user ID to acquire an identity user ID list from the identity server, and using the service user ID and authority associated with the service user ID to acquire a service user ID list, wherein the identity user ID list includes a list of user IDs recognized by the identity server, including the identity user ID and a second identity user ID that is associated with a second user, and belonging to the same identity tenant, and wherein the service user ID list includes a list of user IDs recognized by the service server, including the service user ID and a second service user ID that is associated with the second user, and belonging to the same service tenant; and using the service user ID list, the identity user ID list, and the SSO mapping setting information to perform SSO mapping processing to determine whether to set a combination of service user ID and identity user ID in the SSO mapping setting information as single sign-on setting information, wherein, for each combination of a service user ID and an identity user ID in the SSO mapping setting information set as part of the single sign-on setting information, the service server provides a user, in the identity tenant and the service tenant and associated with a combination set as part of the single sign-on setting information, to receive access to the service of the service server, even users other than the user associated with the service user ID and the identity user ID who requested the collective users setting of single sign-on, and wherein at least one step is performed by at least one processor coupled to a memory.

12. The non-transitory computer-readable storage medium according to claim 11, wherein, in response to both the second service user ID being identical to a service user ID in a first combination of the SSO mapping setting information and the second identity user ID being identical to an identity user ID in the first combination, using to perform SSO mapping processing includes setting the first combination of the SSO mapping setting information as part of the single sign-on setting information.

13. The non-transitory computer-readable storage medium according to claim 12, wherein, prior to setting the first combination of the SSO mapping setting information as part of the single sign-on setting information, using to perform SSO mapping processing includes determining whether at least one user ID in the first combination already is set as part of the single sign-on setting information, wherein, in response to determining that at least one user ID the first combination already is set as part of the single sign-on setting information, using to perform SSO mapping processing includes overwriting existing single sign-on setting information having the at least one user ID with the first combination.

14. The non-transitory computer-readable storage medium according to claim 12, wherein, in response to determining that one of the service user ID and the identity user ID in the first combination is not described, using to perform SSO mapping processing includes releasing registration of SSO mapping for the described other of the service user ID and the identity user ID in the first combination in a case where the described other of the service user ID and the identity user ID in the first combination is included in one of the service user ID list, the identity user ID list.

15. The non-transitory computer-readable storage medium according to claim 11, wherein, in response to either the second service user ID not being identical to a service user ID in a first combination of the SSO mapping setting information or the second identity user ID not being identical to an identity user ID in the first combination, using to perform SSO mapping processing includes not setting the first combination of the SSO mapping setting information as part of the single sign-on setting information.

16. A system comprising:
an identity server;
a client computer; and
a service server to provide a service and communicate with the identity server and the client computer operated by a first user, the service server including:
at least one processor coupled to a memory,
a reception unit configured to receive, from the client computer as provided by and associated with the first user, a service user identification (ID) and a service user password for the service server, an identity user ID and an identity user password for the identity server, a request for collective users setting of single sign-on, and an access request to receive a service of the service server,
an acceptance unit configured to receive, from the client computer, single sign-on (SSO) mapping setting information, wherein the SSO mapping setting information includes at least two combinations of a service user ID and an identity user ID, wherein a service user ID and an identity user ID in a combination are related to each other,
an acquisition unit configured to use the identity user ID, the identity user password, and authority associated with the identity user ID to acquire an identity user ID list from the identity server, and configured to use the service user ID and authority associated with the service user ID to acquire a service user ID list,
wherein the identity user ID list includes a list of user IDs recognized by the identity server, including the identity user ID and a second identity user ID that is associated with a second user, and belonging to the same identity tenant, and wherein the service user ID list includes a list of user IDs recognized by the service server, including the service user ID and a second service user ID that is associated with the second user, and belonging to the same service tenant, and
a setting unit configured to use the service user ID list, the identity user ID list, and the SSO mapping setting information to perform SSO mapping processing to determine whether to set a combination of service user ID and identity user ID in the SSO mapping setting information as single sign-on setting information,
wherein, for each combination of a service user ID and an identity user ID in the SSO mapping setting information set as part of the single sign-on setting information, the service server provides a user, in the identity tenant and the service tenant and associated with a combination set by the setting unit as part of the single sign-on setting information, to receive access to the service of the service server, even users other than the user associated with the service user ID and the identity user ID who requested the collective users setting of single sign-on, and
wherein at least one of the reception unit, the acceptance unit, the acquisition unit, and the setting unit are implemented by the at least one processor.

17. The system according to claim 16, wherein, in response to both the second service user ID being identical to a service user ID in a first combination of the SSO mapping setting information and the second identity user ID being identical to an identity user ID in the first combination, the setting unit sets the first combination of the SSO mapping setting information as part of the single sign-on setting information.

18. The system according to claim 17, wherein, prior to the setting unit setting the first combination of the SSO mapping setting information as part of the single sign-on setting information, the setting unit determines whether at least one user ID in the first combination already is set as part of the single sign-on setting information, wherein, in response to determining that at least one user ID the first combination already is set as part of the single sign-on setting information, the setting unit overwrites existing single sign-on setting information having the at least one user ID with the first combination.

19. The system according to claim 17, wherein, in response to determining that one of the service user ID and the identity user ID in the first combination is not described, the setting unit releases registration of SSO mapping for the described other of the service user ID and the identity user ID in the first combination in a case where the described other of the service user ID and the identity user ID in the first combination is included in one of the service user ID list, the identity user ID list.

20. The system according to claim 16, wherein, in response to either the second service user ID not being identical to a service user ID in a first combination of the SSO mapping setting information or the second identity user ID not being identical to an identity user ID in the first combination, the setting unit does not set the first combination of the SSO mapping setting information as part of the single sign-on setting information.

* * * * *